__United States Patent Office__

3,427,125
Patented Feb. 11, 1969

3,427,125
PROCESS FOR PREPARING HIGHLY PURE CALCIUM HYDROGEN PHOSPHATE DIHYDRATE
Masashi Hayakawa, Tokyo, and Makoto Kadotani and Kunio Ishikawa, Kanagawa-ken, Japan, assignors to Central Glass Co., Ltd., Yamaguchi-ken, Japan, a corporation of Japan
No Drawing. Filed Mar. 20, 1967, Ser. No. 624,138
Claims priority, application Japan, Apr. 6, 1966, 41/21,651
U.S. Cl. 23—109       7 Claims
Int. Cl. C01b 25/32

ABSTRACT OF THE DISCLOSURE

A process for preparing highly pure calcium hydrogen phosphate dihydrate suitable for use as a dentifrice polishing agent, by adding ammonia and a basic sodium salt to impure wet process phosphoric acid to precipitate and separate crystals of sodium ammonium hydrogen phosphate ($NaNH_4HPO_4 \cdot 4H_2O$) or so-called microcosmic salt, and by mixing a calcium salt such as calcium chloride to a solution of said microcosmic salt to precipitate calcium hydrogen phosphate dihydrate ($CaHPO_4 \cdot 2H_2O$) while maintaining the pH of said mixed liquid at 3.5 to 5.0, the temperature thereof at 45° C. or lower and the calcium to phosphorus mol ratio (Ca/P) thereof at 1.0 to 1.3.

BACKGROUND OF THE INVENTION (a) Field of the invention

The present invention relates to a process for preparing at low cost, highly pure calcium hydrogen phosphate dihydrate from wet process phosphoric acid.

(b) Description of the prior art

Most of the highly pure calcium hydrogen phosphate dihydrate has been manufactured by a procedure which is represented by the steps of first conducting a reaction between a refined calcium salt and expensive dry process phosphoric acid, and filtering and washing the precipitates of calcium hydrogen phosphate dihydrate formed from said reaction. The calcium hydrogen phosphate dihydrate which has been obtained from the reaction between the relatively cheaper wet process phosphoric acid and a calcium salt had a color and contained a number of impurities and therefore, it has been impossible to obtain the desired highly pure calcium hydrogen phosphate dihydrate from wet process phosphoric acid as the raw material.

Summary of the invention

The present invention has been developed after extensive research to find a method for producing, at low cost, highly pure calcium hydrogen phosphate dihydrate containing no arsenic, lead or other substances detrimental to the health of humans and animals from a raw material consisting of impure phosphoric acid obtained by treating phosphate rock with sulfuric acid or the like.

According to the study undertaken by the inventors, it has been found that by manufacturing calcium hydrogen phosphate dihydrate from impure wet process phosphoric acid via the intermediary stage of forming a salt of sodium ammonium hydrogen phosphate, there are provided advantages that not only the impurities contained in the phosphoric acid can be eliminated during the step of producing said salt of sodium ammonium hydrogen phosphate, but also calcium hydrogen phosphate dihydrate can be manufactured at a much lower cost than is the case with the prior art procedure in which the calcium hydrogen phosphate dihydrate is produced from highly pure dry process phosphoric acid.

Being based on the foregoing finding, the process of the present invention comprises a first step of producing microcosmic salt from wet process phosphoric acid, and a second step of producing calcium hydrogen phosphate dihydrate as the result of a reaction between said microcosmic salt and a calcium salt. These two steps will hereunder be described in detail as follows.

In the first step, wet process phosphoric acid ($P_2O_5$ content being about 30%) is reacted with an ammonia liquor or a gaseous ammonia to thereby raise the temperature of the liquor by virtue of the neutralization heat while controlling the pH of this liquor so as to lie in the range of from 3.6 to 6.0 at which such impurities as iron, aluminum, fluorine and silica etc.; contained in the phosphoric acid are precipitated, and the resulting precipitates of these impurities are separated by filtering.

Then, to the filtered liquor consisting chiefly of ammonium dihydrogen phosphate ($NH_4H_2PO_4$) is amixed basic sodium salt(s), such as soda ash or caustic soda, for reaction therebetween in such amount that said basic sodium salt(s) to phosphoric acid ($Na_2O/P_2O_5$) mol ratio is 1:1, followed by cooling the liquor or heating and concentrating the liquor to precipitate the crystals of microcosmic salt. The precipitated crystals are then separated from the liquor and washed with a small amount of water, and if necessary, the crystals may be further refined by a re-crystallization technique. The crystals of microcosmic salt thus obtained contain very few impurities. In this first step, therefore, there is altogether no need of performing preliminary refining of phosphoric acid as is required in other methods for preparing phosphates from wet process phosphoric acid.

In the second step, the crystals of microcosmic salt obtained in the first step are dissolved in warm water, and if required, they are filtered, and a saturated solution having a temperature in the range of from 35 to 45° C. is prepared. As for the calcium salt, a solution of, for example, refined calcium chloride having such a concentration as will be saturated at room temperature is used. This solution of a calcium salt may consist of the cheap waste liquor from a distilling column in the ammonia soda process. These two kinds of solutions thus prepared are mixed together, and while stirring the mixture in a reaction vessel, the two solutions are allowed to react with each other so as to precipitate dihydrate of calcium hydrogen phosphate by the following reaction $NaNH_4HPO_4 + CaCl_2 + 2H_2O \rightarrow$
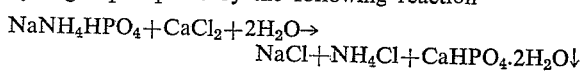
$NaCl + NH_4Cl + CaHPO_4 \cdot 2H_2O\downarrow$ This reaction may be carried out by either a batch process or a continuous process. In the event that the reaction temperature rises to 40°C. or higher, however, there is apt to form anhydrate of calcium hydrogen phosphate ($CaHPO_4$), while in case the calcium to phosphorus mol ratio (Ca/P) is below 1, there is apt to form hydroxylapatite [$Ca_3(PO_4)_2]_3 \cdot Ca(OH)_2$, both of which result in a lowering of the purity of the calcium hydrogen phosphate dihydrate obtained. It is preferred, therefore, that the reaction be conducted at a temperature of 45°C. or lower, with the calcium to phosphorus mol ratio being in the range of from 1. to 1.3 and with the pH of the reaction solution being held in the range between 3.5 and 5.0. It has been found also that the use of an excess amount of calcium salt is effective in controlling the pH of the reaction solution and also in reducing the concentration of $P_2O_5$ contained in the mother liquor after separation of calcium hydrogen phosphate dihydrate therefrom. Based on this finding, it is possible to obtain calcium hydrogen phosphate dihydrate with such a high yield of 98% or more.

The calcium hydrogen phosphate dihydrate thus precipitated is then separated from the mother liquor by the use of an appropriate filter or a separating machine, following which it is thoroughly washed with water, and then is dried by aeration at 40° C., and thus highly pure calcium hydrogen phosphate dihydrate containing no arsenic or lead which are detrimental to humans and animals is obtained. The mother liquor which has been separated from the crystals contains both ammonium chloride and sodium chloride. However, this liquor can be recycled for the dissolving of microcosmic salt and calcium chloride or for the dilution of such solution. Also, a part of said mother liquor can be used as a raw material in an ammonia soda manufacturing factory or other factories requiring such liquor. It is, therefore, possible to use the waste liquor from an ammonia soda factory as the calcium salt solution, while mother liquor after crystallization of calcium hydrogen phosphate can be used as the raw material in an ammonia soda factory. Thus, the process of the present invention has many advantages because of its wide utility as has been described.

In view of the fact that the process for preparing calcium hydrogen phosphate dihydrate of the present invention utilizes the intermediate step of preparing highly pure microcosmic salt in spite of the fact that this process uses wet process phosphoric acid as the raw material, it is possible to obtain highly pure calcium hydrogen phosphate dihydrate with a high yield. For this reason, the calcium hydrogen phosphate dihydrate can be applied to as a dentifrice polishing agent. Specifically, in case it is desired to obtain calcium hydrogen phosphate dihydrate for use as a dentifrice polishing agent, the solution of microcosmic salt or calcium salt is admixed with a stabilizer such as condensed phosphates (tetrasodium pyrophosphate, sodium tripolyphosphate, trimetaphosphate etc.;) and trimagnesium phosphate so that crystals of calcium hydrogen phosphate dihydrate are precipitated containing such stabilizer. The precipitated crystals are then separated from the liquid and dried, with the result that a product which is extremely stable to heat and which has an excellent polishing property is obtained. It is needless to say that the stabilizer may be added directly to the crystals of calcium hydrogen phosphate dihydrate.

Description of the preferred embodiments

Next, a preferred embodiment of the present invention will be described.

Example (a) The step of preparing microcosmic salt crystals from wet process phosphoric acid (the first step).—A wet process phosphoric acid ($P_2O_5$ content being 30%) was reacted with ammonia while the pH of the liquor was controlled to a ringe of from 3.6 to 6.0. The formed precipitates of iron, aluminum, fluorine, silica or the like were separated by filtering. Then soda ash was added to the filtrate (ammonium dihydrogen phosphate solution) in an amount to obtain a sodium oxide to phosphoric anhydride ($Na_2O/P_2O_5$) mol ratio of 1:1. The reacted liquor was cooled down to thereby precipitate crystals of microcosmic salt. The crystals were then separated and washed.

(b) The step of preparing calcium hydrogen phosphate dihydrate from microcosmic salt (the second step).—1.47 kg. of crystals of microcosmic salt obtained in the first step was added with 3.69 kg. of warm water to produce a microcosmic salt solution. The compositions of the microcosmic salt crystals used in this step and the aforesaid solution are shown as follows:

|  | Analysis | | | | | | |
|---|---|---|---|---|---|---|---|
|  | $P_2O_5$ (percent) | $Na_2O$ (percent) | $NH_3$ (percent) | $C-H^2O$ (percent) | Free-$H_2O$ (percent) | As (p.p.m.) | Pb (p.p.m.) |
| Microcosmic salt crystal | 32.4 | 14.1 | 7.7 | 41.0 | 4.8 | 1.5 | 2 |
| Microcosmic salt solution | 9.2 | 4.0 | 2.2 | | | | |

As the calcium salt, a 40% calcium chloride solution was used. This was diluted with 1.5 kg. of mother liquor of this second step. Then, the diluted solution was subjected to continuous reaction with a microcosmic salt at 35° C. in a reaction vessel, with the pH being maintained at 4.3 and the calcium to phosphorus (Ca/P) mol ratio being held at 1.2:1, and thus a dihydrate of calcium hydrogen phosphate was produced. This dihydrate was separated by a centrifugal separator and, as a result, 7.81 kg. of mother liquor was collected. The crystals remaining in the separator were washed with 1 liter of water, and then dried at 40° C., and thus 1.07 kg. of product was obtained.

The compositions of the product and the solution used are shown as follows:

|  | Analysis | | | | | | |
|---|---|---|---|---|---|---|---|
|  | $P_2O_5$ (percent) | CaO (percent) | $CaCl_2$ (percent) | $NH_4Cl$ (percent) | NaCl (percent) | As (p.p.m.) | Pb (p.p.m.) |
| Mother liquor for diluting calcium chloride | 0.2 |  | 1.9 | 5.5 | 6.0 |  |  |
| Diluted calcium chloride solution | 0.1 |  | 22.4 | 2.1 | 2.3 |  |  |
| Mother liquor separated from calcium hydrogen phosphate | 0.2 |  | 1.9 | 5.5 | 6.0 |  |  |
| Dried goods | 41.2 | 32.55 |  |  |  | 0.2 | <1 |

(c) The step of preparing calcium hydrogen phosphate dihydrate for use as a dentifrice polishing agent.—To the microcosmic salt solution obtained in the step (b) was added a calcium chloride solution and 37 gr. of trimagnesium phosphate to thereby crystallize calcium hydrogen phosphate dihydrate. After the crystals were separated, washed and dried, they were pulverized and graded, and as a result, 1.00 kg. of product was obtained. The analysis of the product was conducted, with the following result:

*Analysis*

| | |
|---|---|
| $P_2O_5$ (percent) | 40.13 |
| CaO (percent) | 31.26 |
| MgO (percent) | 1.85 |
| Ignition loss (percent) | 26.40 |
| As (p.p.m.) | 0.2 |
| Pb (p.p.m.) | <1 |
| X-ray diffraction | (¹) |

¹ Only $CaHPO_4 \cdot 2H_2O$ was found.

The result of tests according to Toilet Goods Association Standard (U.S.A.) and other standards conducted on this product is as follows:

| | | |
|---|---|---|
| Titration, ml | 60.1 | By T.G.A. method. |
| Dry loss, percent: | | |
| Prior to stability test | 21.55 | |
| After stability test | 20.73 | A 35% suspension of calcium hydrogen phosphate mixed with glycerine and was heated for 30 minutes, on water bath. |
| Stability, percent | 96.19 | Calculated from values prior to and after the stability test. |
| Dehydration, percent | 1.90 | According to the method of British Patent No. 825976 owned by Monsanto Chemical Co. |
| Grain size (passed 235 mesh), percent | 100 | By T.G.A. method. |
| Bulk specific gravity | 0.24 | JIS-K-5101. |

(d) The step of preparing γ-calcium pyrophosphate.— 150 gr. of dried calcium hydrogen phosphate obtained in the step (b) was calcined at a temperature in the range of from 320° C. to 370° C. in an electric oven for 4 hours, and 110 gr. of γ-calcium pyrophosphate (γ-$Ca_2P_2O_7$) was obtained. This was confirmed to be γ-calcium pyrophosphate by X-ray diffraction. This γ-calcium pyrophosphate is useful as a dentifrice polishing agent containing a fluorine compound.

What is claimed is:
1. A process for preparing highly pure calcium hydrogen phosphate dihydrate, comprising the steps of:
  (1) adding ammonia to wet process phosphoric acid containing impurities to neutralize said acid and to make the pH of the liquor in the range of from about 3.6 to 6.0, separating out the precipitates of the impurities thereby produced, thereafter adding to the resulting filtrate a sodium salt selected from the group consisting of caustic soda and soda ash in an amount such that the mol ratio of the sodium salt (calculated as $Na_2O$) present in said filtrate to the phosphoric acid (calculated as $P_2O_5$) present in said filtrate is about 1:1, crystallizing the microcosmic salt thus produced, filtering out the microcosmic salt crystals and washing them, and then
  (2) dissolving the microcosmic salt crystals in warm water, adding to the resulting solution an aqueous solution of calcium chloride in such an amount that the calcium to phosphorus mol ratio (Ca/P) in the resulting mixed solution is in the range of about 1.0–1.3 while maintaining the pH of the mixed solution in the range of about 3.5–5.0 and maintaining said mixed solution at a temperature not exceeding 45° C. to effect a reaction between said microcosmic salt and said calcium chloride to thereby produce calcium hydrogen phosphate dihydrate, and filtering out said calcium hydrogen phosphate dihydrate thus produced.

2. A process according to claim 1, wherein the solution prepared by dissolving the microcosmic salt in warm water is a saturated aqueous solution at 35° C.–45° C., and said aqueous solution of calcium chloride is a saturated solution at room temperature.

3. A process according to claim 1, wherein the aqueous solution of calcium chloride is a waste liquor obtained, as a by-product of distillation, from the distilling tower in an ammonia soda manufacturing process.

4. A process according to claim 1, wherein the filtrate after filtering out the calcium hydrogen phosphate dihydrate is recycled as a dilute solution for dissolving therein said microcosmic salt and said calcium chloride.

5. A process according to claim 1, wherein at least one stabilizer selected from the group consisting of condensed phosphates and magnesium phosphate is added to one of the solutions consisting of said aqueous solution of microcosmic salt and said aqueous solution of calcium chloride, and thereafter the other aqueous solution is added to said one solution to thereby crystallize calcium hydrogen phosphate dihydrate for use in a dentifrice.

6. A process according to claim 1, wherein said microcosmic salt is crystallized by heating and concentrating said filtrate.

7. A process according to claim 1, wherein said microcosmic salt is crystallized by cooling said filtrate.

References Cited

UNITED STATES PATENTS 3,294,486  12/1966  Cremer et al. _____ 23—109

FOREIGN PATENTS 376,178  7/1932  Great Britain.

E. C. THOMAS, *Primary Examiner.*

L. A. MARSH, *Assistant Examiner.*